United States Patent
Belcher (10) Patent No.: US 10,670,060 B2
(45) Date of Patent: Jun. 2, 2020

(54) REINFORCED SOFT SUBSTRATE WITH HARDCOAT

(71) Applicant: Rolls-Royce Corporation, Indianapolis, IN (US)

(72) Inventor: Bradley D. Belcher, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 320 days.

(21) Appl. No.: 15/599,548

(22) Filed: May 19, 2017

(65) Prior Publication Data

US 2017/0335872 A1  Nov. 23, 2017

Related U.S. Application Data (60) Provisional application No. 62/338,941, filed on May 19, 2016.

(51) Int. Cl.

| | | |
|---|---|---|
| *F16B 5/02* | (2006.01) |
| *C25D 5/56* | (2006.01) |
| *C23C 18/16* | (2006.01) |
| *C25D 7/00* | (2006.01) |
| *C25D 5/18* | (2006.01) |
| *B64C 1/00* | (2006.01) |

(52) U.S. Cl.
CPC ............ *F16B 5/02* (2013.01); *C23C 18/1653* (2013.01); *C25D 5/56* (2013.01); *C25D 7/00* (2013.01); *B64C 2001/0054* (2013.01); *C25D 5/18* (2013.01)

(58) Field of Classification Search
CPC ......... F16B 5/02; C23C 18/1653; C25D 7/00; C25D 5/56; C25D 5/18; B64C 2001/0054
See application file for complete search history.

(56) References Cited

U.S. PATENT DOCUMENTS

| | | |
|---|---|---|
| 3,022,870 A | 2/1962 | John et al. |
| 3,817,540 A | 6/1974 | Nicholson et al. |
| 4,980,005 A | 12/1990 | Scollard |
| 5,380,382 A | 1/1995 | Izdebski |
| 6,039,323 A | 3/2000 | Mockenhaupt et al. |
| 6,050,208 A | 4/2000 | Kennedy |

(Continued)

FOREIGN PATENT DOCUMENTS

| | | |
|---|---|---|
| WO | 2015006400 A1 | 1/2015 |
| WO | 2015006493 A1 | 1/2015 |

OTHER PUBLICATIONS

Notice of Allowance from U.S. Appl. No. 15/273,184, dated Jan. 4, 2019, 9 pp.

(Continued)

*Primary Examiner* — Brian Handville
(74) *Attorney, Agent, or Firm* — Shumaker & Sieffert, P.A.

(57) ABSTRACT

In one example, an article including a soft substrate defining at least one of a first outer perimeter of the substrate or an aperture extending through the soft substrate defining a second outer perimeter of the aperture; a hard coating on the outer surface of the soft substrate; and at least one reinforcement member extending through the soft substrate at a location adjacent to at least one of the first outer perimeter or the second outer perimeter, wherein the at least one reinforcement member increases resistance to compression of the soft substrate at the location of the at least one reinforcement member.

19 Claims, 5 Drawing Sheets

(56) References Cited

U.S. PATENT DOCUMENTS

| | | |
|---|---|---|
| 6,630,249 B2 | 10/2003 | Kennedy |
| 6,706,406 B1 | 3/2004 | Kennedy |
| 6,984,452 B2 | 1/2006 | Kennedy |
| 8,932,418 B2 | 1/2015 | Jendrny |
| 8,973,241 B1 | 3/2015 | Gooch |
| 2001/0035266 A1* | 11/2001 | Kennedy ................ B32B 15/06 156/331.4 |
| 2009/0194224 A1* | 8/2009 | Jendrny ................ B21J 15/02 156/92 |
| 2012/0121362 A1 | 5/2012 | Taylor et al. |
| 2016/0160869 A1 | 6/2016 | Roach et al. |

OTHER PUBLICATIONS

Notice of Allowance from U.S. Appl. No. 15/273,184, dated Apr. 19, 2019, 5 pp.

\* cited by examiner

REINFORCED SOFT SUBSTRATE WITH HARDCOAT

This application claims the benefit of U.S. Provisional Application No. 62/338,941, filed May 19, 2016, and titled, "REINFORCED SOFT SUBSTRATE WITH HARD-COAT," the entire content of which is incorporated herein by reference.

TECHNICAL FIELD

In one aspect, the disclosure relates to high strength articles, e.g., high strength metal-polymer articles for use in aerospace componentry.

BACKGROUND

Aerospace components are often operated in relatively extreme environments that may expose the components to a variety of stresses or other factors including, for example, thermal cycling stress, shear forces, compression/tensile forces, vibrational/bending forces, impact forces from foreign objects, erosion and corrosion, and the like. The exposure of the aerospace components to the variety of stresses, forces, and other factors may impact the lifespan of the component, such as leading to early fatigue or failure. In some examples, aerospace components have been developed that exhibit higher strength and durability using high density metals or metal alloys. However, some high density metals or metal alloys may be relatively heavy, difficult to manufacture, and expensive making their use non-ideal for aerospace applications.

SUMMARY

In one example, the disclosure relates to an article comprising a soft substrate defining at least one of a first outer perimeter of the substrate or an aperture extending through the soft substrate defining a second outer perimeter of the aperture; a hard coating on the outer surface of the soft substrate; and at least one reinforcement member extending through the soft substrate at a location adjacent to at least one of the first outer perimeter or the second outer perimeter, wherein the at least one reinforcement member increases resistance to compression of the soft substrate at the location of the at least one reinforcement member.

In another example, the disclosure relates to a method comprising forming a soft substrate that defines at least one of a first outer perimeter of the substrate or an aperture extending through the soft substrate defining a second outer perimeter of the aperture and at least one reinforcement member extending through the soft substrate at a location adjacent to at least one of the first outer perimeter or the second outer perimeter; and forming a hard coating on an outer surface of the soft substrate, wherein the at least one reinforcement member increases resistance to compression of the soft substrate at the location of the at least one reinforcement member.

The details of one or more examples are set forth in the accompanying drawings and the description below. Other features, objects, and advantages will be apparent from the description and drawings, and from the claims.

DETAILED DESCRIPTION

In some examples, the disclosure describes examples articles, assemblies, and techniques related to articles including a soft substrate with a hard coating on the outer surface of the soft substrate. While the examples in this disclosure are described primarily in the context of components for aerospace applications, such examples may include articles, assemblies, and techniques related to non-aerospace applications in which hard coated soft substrates may be employed for components. In some examples, components for aerospace applications may be formed of a soft substrate coated with a hard metallic outer coating, e.g., as compared to a component formed entirely of a metal or metal alloy, to reduce cost and/or reduce the overall weight of a component. In assemblies using such components, those components may be exposed to compressive forces when attached to other components in the assembly that may compromise the integrity of the soft substrate, e.g., by "crushing" in the soft substrate under the compressive force, as well as the hard coat on the surface of the soft substrate.

In accordance with one or more examples of the disclosure, a component including a soft substrate and hard outer coating may also include one or more reinforcement members extending through the soft substrate and/or soft substrate and hard coating at one or more locations of the component to increase the resistance of the soft substrate to a compressive force at that location. The compressive for may be applied to the component by an attachment mechanism to attach or other secure the component to another structure, e.g., using an attachment bolt and/or clamp.

For example, a component may include one or more reinforcement members extending through the soft substrate at position adjacent the outer perimeter of an attachment aperture formed in the component. To attach the component to another component in an assembly, a bolt or other mechanical fastening member may be extended through the attachment aperture and then may apply a compressive force into the surface of the component adjacent the attachment aperture to attach the two components, e.g., when a bolt is tightened within the aperture. The reinforcement member(s) in the soft substrate adjacent the attachment aperture may be formed of a harder material than the soft substrate and increase the resistance of the soft substrate to the applied compressive force, e.g., as compared to the resistance of the soft substrate and hard coating without the presence of reinforcement member(s). In some examples, composition of the reinforcement member(s) may be substantially the same as that of the hard coating on the soft substrate, while in other examples, the composition may be different. By employing the reinforcement members adjacent to the attachment aperture(s) in a component, the component may exhibit a suitable resistance to compression in the areas in which compressive forces may be applied while still allowing for the use of soft substrate coated with a hard coating in areas in which resistance to compression is not required. In those portions, the component may not include any such reinforcement members in the soft substrate.

As another example, a component may additionally or alternatively include one or more of such reinforcement members extending through the soft substrate at position adjacent the outer perimeter of outer perimeter of the soft substrate. To attach the component to another component in an assembly (e.g., by fixing the position of the component relative one another), a clamp or other suitable mechanical fastener may apply a compressive force into the surface of the component at a position at or near the outer perimeter of the component and soft substrate, e.g., using a toe clamp, band clamp, or the like. Similar to that described above with regard to the reinforcement member(s) adjacent to the outer perimeter of an attachment aperture, the one or more reinforcement members may extend through the soft substrate at the location adjacent the outer perimeter of the soft substrate where the compressive force is applied by the clamp, and increase the resistance of the soft substrate to the compressive force.

Figure 1:
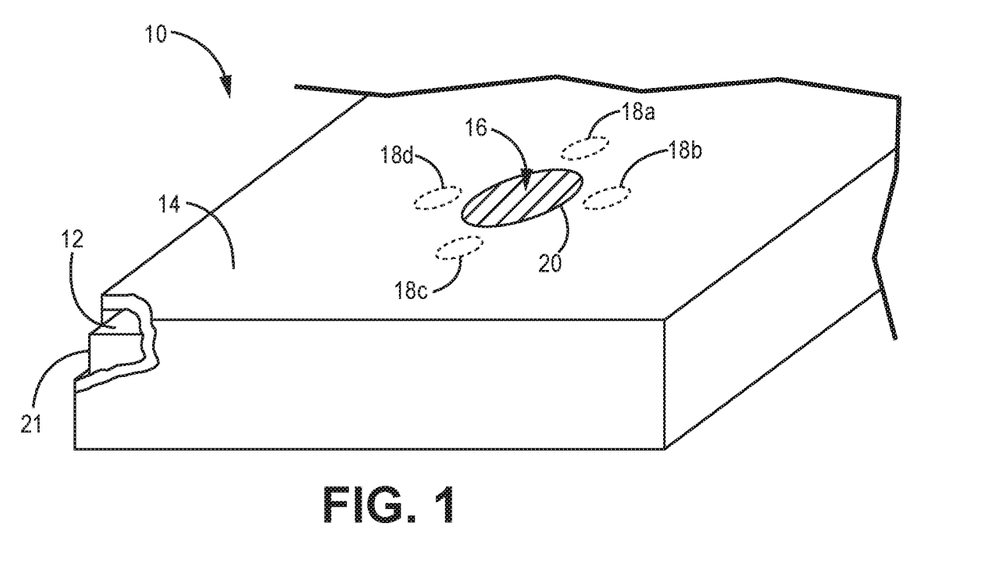
FIG. 1 is a conceptual diagram of an example component including a soft substrate and hard coating on the outer surface of soft substrate.
Figure 2:
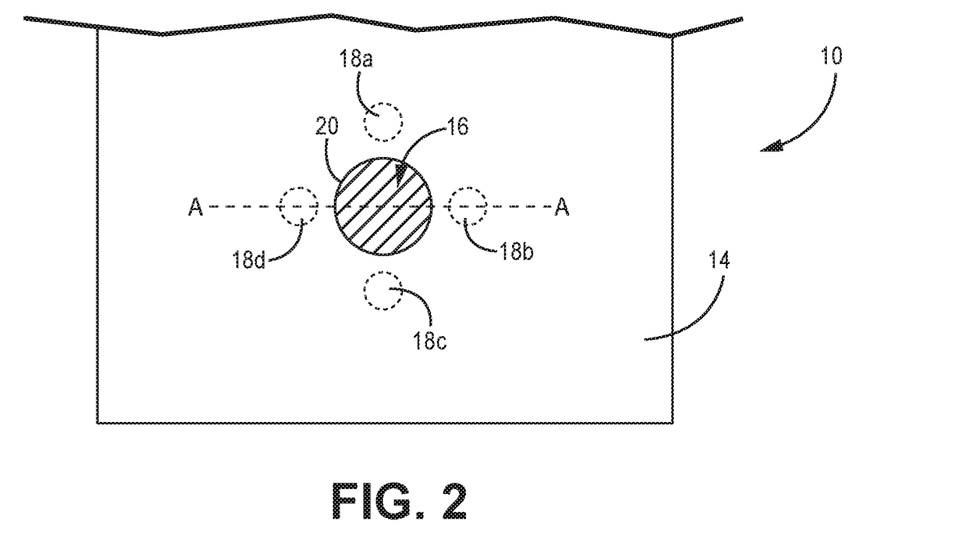
FIG. 2 is a conceptual diagram illustrating a plan view of the component of FIG. 1.

FIG. 1 is a conceptual diagram of example component 10 including soft substrate 12 and hard coating 14 on the outer surface of soft substrate 12. FIG. 2 is a conceptual diagram illustrating a plan view of component 10 of FIG. 1. For illustrative purposes, an exposed portion of soft substrate 12 is shown in FIG. 1. However, hard coating 14 may cover substantially the entire outer surface of soft substrate 12. In other examples, hard coating 14 may only cover a portion of soft substrate 12. Component 10 is shown in FIG. 1 as exhibiting a relatively simple geometry. However, other more complex geometries are contemplated and the geometry may be determined based on the desired use of component 10. In some examples, component 10 may form a bracket, vain, cases, frames, brackets, supports, panels, covers, struts, pipes, tubing, conduits, and the like.

Component 10 may be any suitable article which may employ soft substrate 12 with hard coating 14. Soft substrate 12 may serve to define the general shape and size of component 10. Hard coating 14 may be formed on the outer surface of soft substrate 12, e.g., to provide strength and/or environmental resistance to component 10 not otherwise provided by soft substrate 12 but that is desired for the intended application of component 10.

The term "soft" and "hard" as used with regard to soft substrate 12 and hard coating 14 may refer to the relative strength of the respective features. For example, hard coating 14 may exhibit a strength that is greater than the strength of soft substrate 12. Strength may refer to the elastic modulus for stiffness of the material and/or hardness for susceptibility to plastic deformation of the material.

Soft substrate 12 and hard coating 14 may have any suitable composition. In some examples, soft substrate 12 may be a polymer substrate (e.g., plastic substrate) including one or more polymers, a metal substrate comprising metal or metal alloys with a relative low modulus of elasticity, e.g., as compared to that of metal hard coating 14, or a low density metal foam, and/or a ceramic coating including a low porosity ceramic. Such substrates materials may be susceptible to being crushed or otherwise undesirable compression by application of a clamping load for attachment of component 10 to another component. Hard coating 14 may be a metal hard coating comprising metal or metal alloys, a ceramic hard coating comprising one or more ceramics, and/or a polymer coating comprising polymers exhibiting a higher strength compared to that of soft substrate 12. In some examples, soft substrate 12 may be substantially softer than hard coating 14 (e.g., about 10 percent or less of the hardness of hard coating 14).

Soft substrate 12 includes a polymer-based substrate and hard coating 14 includes a metallic hard coat. In some examples, the Young's Modulus of elasticity ($10^6$ psi) for polymer-based substrate 12 may be less than about typically less than about 10, and for metallic hard coating 14 may be greater than about 20, such as, e.g., greater than about 30, greater than about 40, greater than about 50.

In one example, soft substrate 12 is a polymer-based substrate and hard coating 14 is a high strength nano-crystalline metallic coating applied to at least a portion of a polymer-based substrate, e.g., as used to form aerospace components that exhibit improved strength and reduced weight characteristics compared to conventional titanium, steel, or other high density metal components. Example polymeric material for a polymer-based substrate may include, for example, polyether ether ketone (PEEK), polyamide (PA), polyimide (PI), bis-maleimide (BMI), epoxy, phenolic polymers (e.g., polystyrene), polyesters, polyurethanes, silicone rubbers, copolymers, polymeric blends, and the like. In some examples, the polymeric material may be combined with one or more optional additives including, for example, binders, hardeners, plasticizers, antioxidants, and the like.

Soft substrate 12 be formed using any suitable technique based on the composition of substrate 12. For example, in the case of a polymer-based substrate, for example, substrate 12 may be formed using a mold process in which molten polymeric material may be combined with optional additives and cast into a three-dimensional mold to form polymer-based substrate 12 with the desired shape. In some examples, polymeric material may be injected into a mold containing structure reinforcement fibers wherein polymeric material encases and solidifies around the reinforcement fibers to form polymer-based substrate 12 with the desired shape. In other examples, polymer-based substrate 12 may be fabricated as a sheet/foil, which may be substantially planar (e.g., planar or nearly planar) or sculpted into a desired shape (e.g., a panel in the shape of the leading edge of an airfoil). In the case of substrate 12 including a metal or metal alloys with a relative low modulus of elasticity, substrate 12 may be formed using a metal casting process in which molten material is cast in a three-dimensional mold to form substrate 12 with the desired shape.

Hard coating 14 (e.g., in the form of a metallic nano-crystalline coating) of component 10 may include one or more layers of metals or metal alloys that defines an ultra-fine-grained microstructure with an average grain size less than about 50 nanometers (nm). In some examples, the reduced grain size of hard coating 14 may increase the relative tensile strength of the resultant layer as well as the overall hardness of the layer, such that hard coating 14 may be significantly stronger and more durable compared to a conventional metallic coating (e.g., coarse grain coating) of the same composition and thickness. In some examples, the increased strength and hardness of hard coating 14 may allow for the layer to remain relatively thin (e.g., between about 0.025 millimeters (mm) and about 0.15 mm) without sacrificing the desired strength and hardness characteristics of the layer. Additionally, or alternatively, depositing a relatively thin layer of hard coating 14 on polymer-based soft substrate 12 may help reduce the overall weight of component 10 by reducing the volume of denser metals or metal alloys. The combination of the relatively light weight polymer-based substrate 12 and hard coating 14 may result in a relatively high strength, relatively low weight article ideal for aerospace components.

Hard coating 14 in the form of a metallic nano-crystalline coating may define an ultra-fine-grained microstructure having average grain sizes less than about 50 nm. In some examples, the average grain size of metallic nano-crystalline coating 14 may be less than about 20 nm, such as less than about 5 nm. Hard coating 14 may include one or more pure metals or metal alloys including, for example, cobalt, nickel, copper, iron, cobalt-based alloys, nickel-based alloys, copper-based alloys, iron-based alloys, or the like deposited on at least a portion of polymer-based substrate 12. In some examples, the metal or metal alloy may be selected so that hard coating 14 possesses a Young's modulus greater than about 200 gigapascal (GPa).

In examples in which hard coating 14 comprises a metallic coating, such as, e.g., a metallic nano-crystalline coating, hard coating 14 may be formed using suitable plating techniques, such as electro-deposition. For example, a polymer-based soft substrate 12 may be suspended in suitable electrolyte solution that includes the selected metal or metal alloy for hard coating 14. A pulsed or direct current (DC) may then be applied to polymer-based soft substrate 12 to plate the substrate with the fine-grained metal to form hard coating 14 to a desired thickness and average grain size. In some examples a pulsed current may be utilized to obtaining an average grain size less than about 20 nm.

In such examples, polymer-based soft substrate 12 may be initially metalized in select locations with a base layer of metal to facilitate the deposition process of forming hard coating 14 on polymer-based soft substrate 12 using electro-deposition. In some examples, the metalized base layer on polymer-based soft substrate 12 may be produced using, for example, electroless deposition, physical vapor deposition (PVD), chemical vapor deposition (CVD), cold spraying, gas condensation, and the like. The layer formed using metallization may include one or more of the metals used to form hard coating 14.

In some examples, hard coating 14 may be configured to exhibit improved barrier protection against erosion or corrosion compared to traditional materials used for aerospace components. For example, in examples in which hard coating 14 comprises a metallic nano-crystalline coating, hard coating 14 may include a layer of nano-crystalline cobalt. The layer of nano-crystalline cobalt may impart anti-corrosion properties to component 10 as well as increased friction resistance and wear resistance to hard coating 14 compared to traditional materials used for aerospace components.

Additionally, or alternatively, hard coating 14 may be configured to contribute to the durability of component 10 to resist impact damage from foreign objects during operation. For example, to improve impact damage resistance against foreign objects, aerospace components have traditionally been formed or coated with high strength metals such as titanium. Such techniques, however, may suffer from increased costs associated with processing and raw materials. Additionally, components formed from high strength metals such as titanium tend to result in relatively dense and heavy components which may be less desirable in aerospace applications. Forming component 10 to include polymer-based substrate 12 (or other soft substrate 12 composition) and hard coating 14, e.g., in the form of a metallic coating, may significantly reduce the weight of component 10 compared to those formed with traditional high strength metals (e.g., titanium) while also obtaining comparable or even improved impact damage resistance characteristics.

In some examples, the thickness of hard coating 14 (e.g., in the form of a metallic nano-crystalline coating) may be between about 0.025 mm and about 0.15 mm. In some examples, hard coating 14 may be about 0.13 mm (e.g., about 0.005 inches). In some examples, the overall thickness 18 of hard coating 14 may be selectively varied on different portions of soft substrate 12 to withstand various thermal and mechanical loads that component 10 may be subjected to during operation. For example, in areas where increased impact damage resistance is desired, e.g., the leading edge of a turbine blade, the relative thickness of hard coating 14 may be increased to impart greater strength properties in that region. Additionally, or alternatively, thickness 18 of hard coating14 in regions where increased impact damage resistance is less desired, the thickness of the coating may be reduced or removed from component 10.

In some examples, hard coating 14 may include a plurality of layers. For example, in the case of a metallic nano-crystalline coating, hard coating 14 may include a plurality of metallic nano-crystalline layers rather than a single layer. In some examples, hard coat 14 includes a first and a second metallic nano-crystalline layer that are selectively tailored to produce a metallic nano-crystalline coating with desired physical, thermal, and chemical (e.g., corrosion resistance) characteristics. For example, the first metallic nano-crystalline layer may include nano-crystalline nickel or nickel-based alloy which may impart high tensile strength properties to metallic nano-crystalline coating to contribute to the overall durability of article component 10. The second metallic nano-crystalline layer may include nano-crystalline cobalt or a cobalt-based alloy, which may impart anti-corrosion properties to metallic nano-crystalline coating as well as friction resistance and wear resistance.

As shown, FIGS. 1 and 2, component 10 includes aperture 16 that extends through the thickness of soft substrate 12 and hard coating 14. As will be described further below, aperture 16 may be used as an attachment aperture 16 configured to receive a bolt or other mechanical hardware that allows component 10 to be attached to another component in multicomponent assembly. Additionally, component 10 includes a plurality of individual reinforcement members 18*a*-18*d* (collectively referred as reinforcement members 18) adjacent to outer perimeter 20 of aperture 16. In the illustrated example, reinforcement members 18 are covered by hard coating 14 as represented by the dashed lines in FIGS. 1 and 2. While the reinforcement members 18 includes four individual reinforcement members 18*a*-18*d*, other amounts are contemplated, such as a single reinforcement member or two, three, five, six, or more than six reinforcement members 18.

Figure 3:
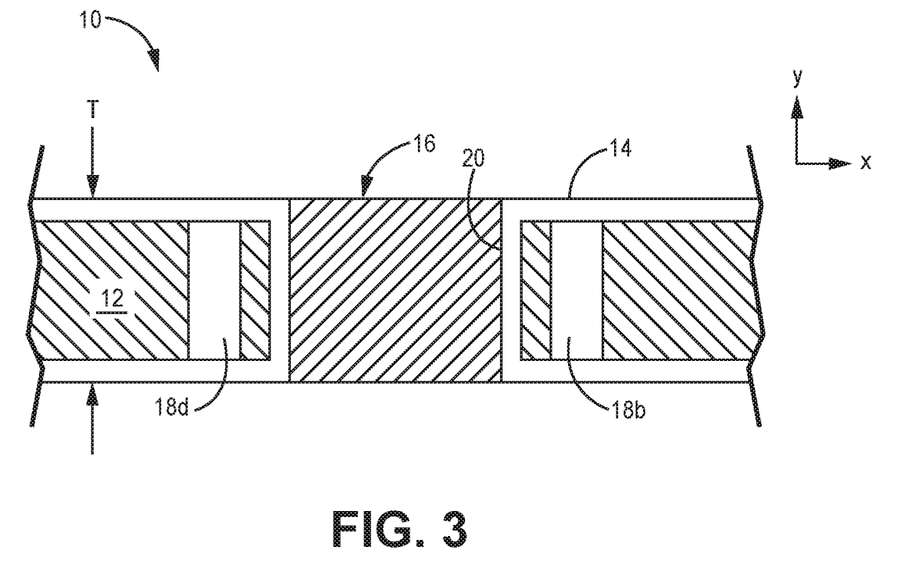
FIG. 3 is a conceptual diagram illustrating component 10 along cross-section A-A shown in FIG. 2.

FIG. 3 is a conceptual diagram illustrating component 10 along cross-section A-A shown in FIG. 2. As shown in FIG. 3, aperture 16 extends through the thickness (T) of component 10 along the y-axis direction. Component 10 may have thickness of approximately 0.1 inches to approximately 1.0 inch although other thicknesses are contemplated. As the thickness of component 10 is reduced, there may be less benefit in terms of cost and/or weight compared to that of a component 10 being formed a single material, e.g., a metal substrate. In the example of FIG. 3, the outer surface of hard coating 14 extends in a plane substantially orthogonal to the y-axis direction.

Aperture 16 may have any suitable shape and size. In the example shown in FIGS. 1-3, aperture 16 exhibits a substantially cylindrical shape with diameter that substantially corresponds to the shape and diameter of a bolt to extend through aperture 16, e.g., to attached component 10 to another component 10 in an assembly.

Reinforcement members 18ba and 18d are adjacent to outer perimeter 20 and extend through the thickness of soft substrate 12 in a direction substantially the same as that of aperture 16 extending through component 10. As described herein, reinforcement members 18 may increase the resistance of component 10 to a compressive force applied adjacent to aperture 16, e.g., in a direction substantially orthogonal to the surface plane of component 10 and/or a direction substantially parallel to the direction that aperture 16 extends through soft substrate 12. For example, when substantially the same compressive force is applied in the negative y-axis direction (as indicated in FIG. 3) to component 10 adjacent to the outer perimeter 20 of aperture 16 and a component substantially the same as component 10 but without reinforcement members 18, soft substrate 12 may compress (e.g., in the negative y-axis direction) around aperture 16 less than the soft substrate of the other component without reinforcement members. In another example, soft substrate 12 may not substantially compress (e.g., in the negative y-axis direction) around aperture 16 while the soft substrate of the other component without reinforcement members does compress around aperture 16 when substantially the same force is applied. In some examples, the compressive force may be sufficient to compromise the integrity of hard coating 14, e.g., through perforation or by substantially disbanding hard coating 14 from soft core 14, if reinforcement members 18 where not included in component 10.

Reinforcement members 18 may have any suitable shape and size. In the example shown in FIGS. 1-3, each individual reinforcement member 18a-18d is a cylindrical column although other shapes are contemplated. In some examples, the cross sectional shape, size, and/or quantity of the reinforcement members 18 may be designed to prevent or otherwise reduce the susceptibility of reinforcement members 18 to buckling under an applied compressive force, particularly for instances in which component 10 is relative thick such that reinforcement members 18 may be relative tall, e.g., in the y-direction.

Reinforcement members 18 may be adjacent to outer perimeter 20 of aperture 16 within any suitable proximity. In general, reinforcement members 20 may be near enough outer perimeter 20 of aperture 16 to provide an increase in resistance to compression for a force applied proximate aperture 16, e.g., in the case of the compressive force applied by a tightened bolt in aperture 16 to secure component 10 to another component. While reinforcement members 18 are adjacent the outer perimeter 20 of aperture 16, reinforcement members 16 do not form outer perimeter 20. Rather, as shown in FIG. 3, hard coating 14 on soft substrate 12 defines the surface of outer perimeter 20, and a portion of soft substrate 12 is between outer perimeter 20 and reinforcement member 20. In other examples, hard coat 14 does not cover the surface of outer perimeter 20 of aperture 16 extending through soft substrate 12.

As will be described below with regard to FIG. 4, reinforcement members 16 may be located relative aperture 16 in a position corresponding to the location that component 10 is expected to experience a compressive force when a bolt or other attachment article extends through aperture 16, e.g., attached component 10 to another component. While FIGS. 1-3 illustrate reinforcement members 18 all being substantially the same distance from perimeter 20 of aperture, in other examples, such distances may vary among individual reinforcement member 18a-18d.

Reinforcement members 18 may be formed of any suitable material that allows for reinforcement members 18 to function as described herein. Reinforcement members 18 may a composition different than that of soft substrate. In some examples, reinforcement members 18 may include any material which allows reinforcement members 18 to exhibit sufficiently high compressive strength to resist a threshold compressive force without allowing substantially compressing under the applied force. The threshold compressive force may be a force anticipated to be applied by an attachment mechanism to substrate 12 for attachment of component 10 to another component. In some examples, reinforcement members 18 may have substantially the same composition and/or be formed of the same material as that of hard coat 14. The composition of reinforcement members 18 may be selected to be compatible with the composition of soft substrate 12 and hard coating 14, e.g., to avoid deleterious interactions such as, e.g., galvanic corrosion.

Figure 4:
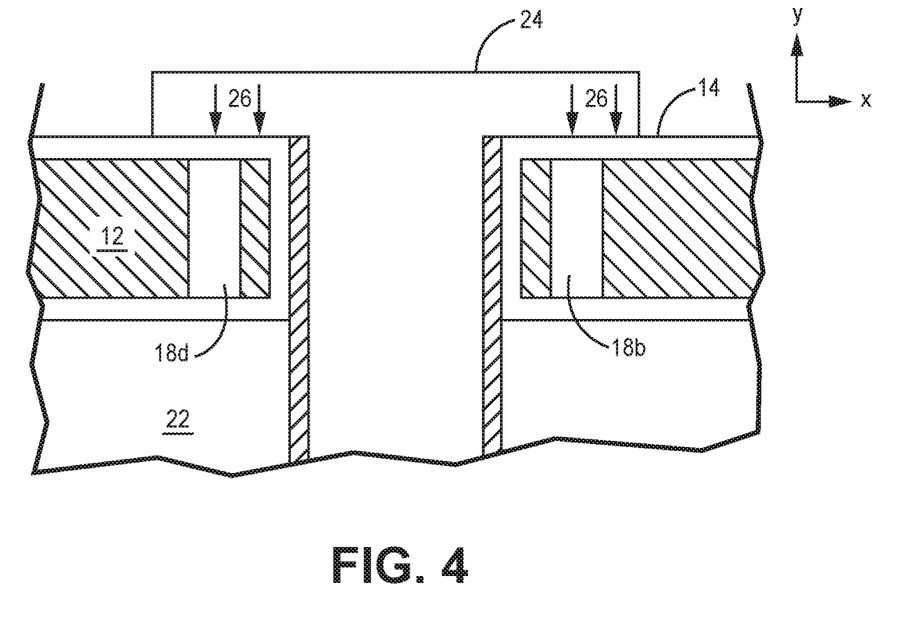
FIG. 4 is a conceptual diagram illustrating an assembly including the component of FIGS. 1-3 and an attachment bolt.

FIG. 4 is a conceptual diagram illustrating an assembly including component 10 of FIGS. 1-3. As shown, the assembly also includes attachment bolt 24 and base substrate 22. Base substrate 22 is located below component 10 and an attachment aperture in base substrate 22 is aligned with aperture 16 of component 10. Attachment bolt 24 extends through aperture 16 and the attachment aperture in base substrate 22. As shown, the flanged portion of bolt 24 rest on the top surface of component 10 adjacent aperture 16. To attach or otherwise fix component 10 to base substrate 22, a nut (not shown) may be threaded on the opposite end of bolt 24 and tightened. When tightened, the flanged portion of bolt 24 may apply a compressive force 26 on the opposing surface of component 10, e.g., in substantially the negative y-axis. While the flanged portion of bolt 24 is shown as being in direct contact with component 10, in other examples, the force 26 may be applied indirectly, e.g., via one or more washers located between the flanged portion of bolt 24 and component 10. In some examples, the applied compressive force 26 is a static force when component 10 is designed to be permanently attached, or for extended periods, to substrate 22 in the assembly.

As shown in FIG. 4, reinforcement members 18 are located adjacent aperture 16 such that reinforcement members 18 are below the flanged portion of bolt 24 and the portion component 10 where compressive force 26 is applied by bolt. In this manner, reinforcement members 18 may increase the resistance of component 10 to compressive force 26 applied by tightening bolt 24 adjacent aperture 16, e.g., as compared to the resistance exhibited by only hard coat 14 and soft substrate 12 adjacent aperture 16. By employing reinforcement member 18 adjacent aperture 16 at portions in which component 10 experiences external compressive forces but not at other portions in which component 10 does not experience such external compressive forces (or substantially no compressive force), component 10 may be suitably formed of soft substrate 12 and hard coating 14 rather than requiring component 10 to be formed of a single, hard metal substrate, for example.

As shown in FIG. 3, reinforcement members 18 may extend substantially all the way through thickness T of soft substrate 12 (e.g., with the ends of reinforcement members 18 being substantially even with the outer surface of soft substrate 12), and hard coating 14 may be formed over soft substrate 12 and reinforcement members 18. Such a component may be formed by inserting reinforcement members into soft substrate 12 prior to forming hard coating 14 over soft substrate 12 and reinforcement members 18.

Figure 5:
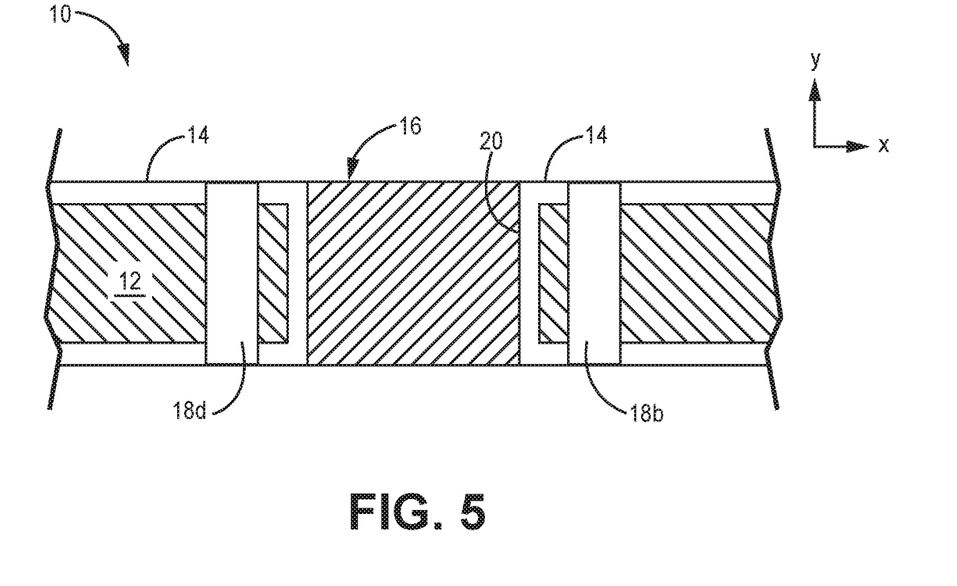
FIG. 5 is a conceptual diagram illustrating another example of a component in accordance with the disclosure.

FIG. 5 is a conceptual diagram illustrating another example of component 10 in which the ends of reinforcement members 18 extend out of soft substrate 12. As shown in FIG. 5, the end portions of reinforcement members 18 are not completely covered by hard coating 14. Such a component may be formed by first forming hard coating 14 over substrate 12 and then inserting reinforcement members through hard coating 14 and substrate 12 after hard coating 14 has been applied.

Figure 6:
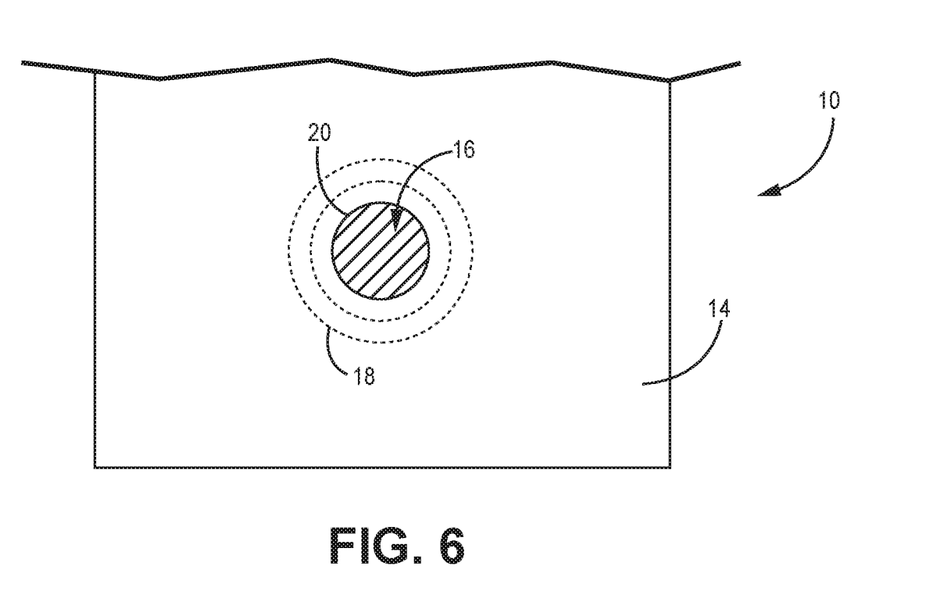
FIG. 6 is a conceptual diagram illustrating another example of a component in accordance with the disclosure.

FIG. 6 is a conceptual diagram illustrating a plan view of another example of component 10. The example of FIG. 6 may be substantially the same as that of FIG. 3 except that reinforcement member 18 is formed of a single reinforcement member rather than multiple discrete reinforcement members 18a-18d. In the example shown, reinforcement member 18 takes the form of a ring that surrounds the outer perimeter 20 of aperture 16. However, other shapes and sizes are contemplated.

As noted above, examples of the disclosure include hard coated, soft substrate components with one or more reinforcement members 18 within substrate 12 at location(s) adjacent the outer perimeter 21 of soft substrate 12 in addition to, as an alternative to, reinforcement member 18 adjacent outer perimeter of aperture 16.

Figure 7:
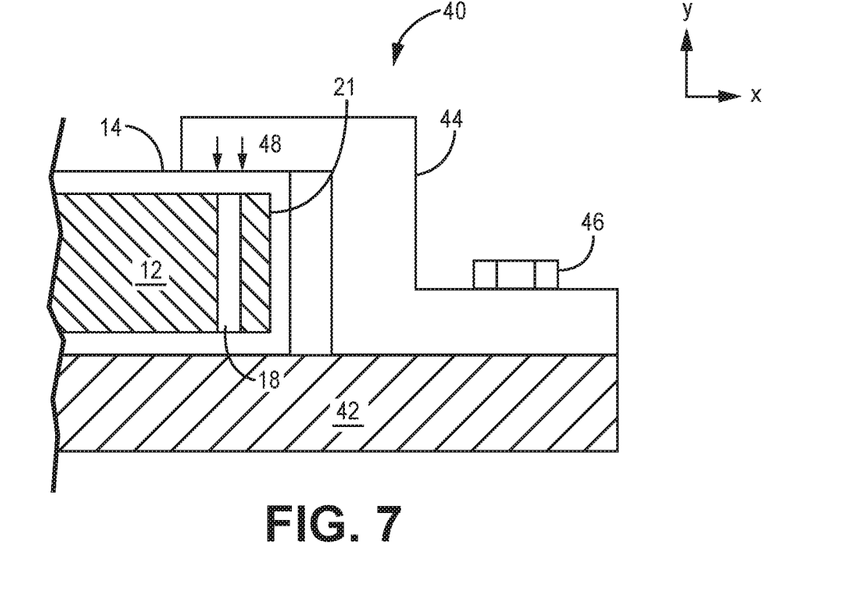
FIG. 7 is a conceptual diagram illustrating another example of a component in accordance with the disclosure.

FIG. 7 is schematic diagram illustrating a cross-sectional view of assembly 40 including component 10 of FIG. 1 attached or otherwise fixed to another substrate 42 via clamp 44. As shown, reinforcement member 18 extends within substrate adjacent to outer perimeter of substrate 21. For ease of illustration, reinforcement member 18 adjacent to outer perimeter 21 of soft is not shown in the embodiment illustrated in FIGS. 1 and 2. However, reinforcement member(s) 18 may be substantially the same or similar to that of reinforcement members 18a-18d described with regard to FIGS. 1-6 but located adjacent the outer perimeter 21 of soft substrate 12 rather than adjacent attachment aperture 16.

To attach or otherwise secure component 10 to substrate 42, bolt 42 may attach clamp 44 (shown as a toe clamp) to substrate 42, e.g., via an attachment aperture in substrate 42. Bolt 42 may be tightened such that clamp 44 applies a compressive force 48 into the outer surface of hard coating and soft substrate 12 in substantially y-axis direction. As described above, reinforcement member 18 may be positioned in soft substrate where compressive force 48 is applied by clamp 44 to increase the resistance of soft substrate 12 and/or hard coating 14 to compression, e.g., as compared to an example in which reinforcement member 18 is not included. The increased resistance to applied compressive force 48 by reinforcement member 18 may be substantially the same or similar to that described with regard to reinforcement members 18a-18d described with regard to aperture 16.

Figure 8:
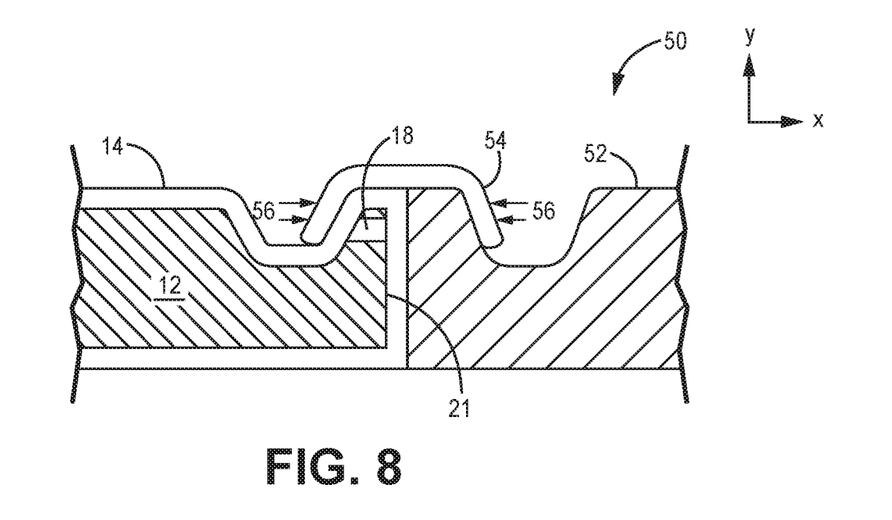
FIG. 8 is a conceptual diagram illustrating another example of a component in accordance with the disclosure.

FIG. 8 is schematic diagram illustrating a cross-sectional view of another assembly 50 including component 10 of FIG. 1 attached or otherwise fixed to another substrate 52 via clamp 54. Clamp 54 takes the form of a band clamp, such as, e.g., a V-band clamp. Similar to that of FIG. 7, reinforcement member 18 is located adjacent to the outer perimeter 21 of soft substrate 12. For ease of illustration, reinforcement member 18 adjacent to outer perimeter 21 of soft is not shown in the embodiment illustrated in FIGS. 1 and 2. However, reinforcement member(s) 18 may be substantially the same or similar to that of reinforcement members 18a-18d described with regard to FIGS. 1-6 but located adjacent the outer perimeter 21 of soft substrate 12 rather than adjacent attachment aperture 16.

Unlike that of the example shown in FIG. 7, reinforcement member extends within soft substrate 12 in substantially the x-axis direction. Such an arrangement accounts for the direction of compressive force 56 applied by band clamp 54 when used for attachment of component 10 to substrate 52. As shown, soft substrate 12 and substrate 52 includes an indention along the outer edge to define an edge protrusion in each substrate4 around which clamp 54 may be placed and then tightened to attach component 10 to substrate 52. In this manner, the compressive force 56 from clamp 54 may be applied along substantially the x-axis direction. Reinforcement member 18 is arranged to extend within soft substrate in a direction substantially parallel to the applied compressive force 56 to increase the resistance of soft substrate 12 and/or hard coating 14 to compression, e.g., as compared to an example in which reinforcement member 18 is not included. The increased resistance to applied compressive force 48 by reinforcement member 18 may be substantially the same or similar to that described with regard to reinforcement members 18a-18d described with regard to aperture 16.

In some examples, the size and/or shape of a reinforcement member, such as, e.g., reinforcement members 18a-18d of FIG. 2 or reinforcement member 18 of FIGS. 7 and 8, may be driven by one or more considerations. For example, the cross sectional area for each member may be designed to provide a desired collective compressive load resistance. As another example, the cross sectional area may be selected to provide resistance to buckling under compression, e.g., if the reinforcement members 18 have a height long enough through a thick section of soft core material. The distribution area for the applied load to be reacted may be taken into consideration (e.g. what is the diameter of the bolt head, or washer, or toe clamp, etc., that will be applying the compressive force). As another example, there may be a minimum practical size for the individual reinforcement members, e.g., based on the manufacturing process (in terms of fabrication, handling, and the like).

Additionally, or alternatively, the proximately of a reinforcement member, such as, e.g., reinforcement members 18a-18d of FIG. 2 or reinforcement member 18 of FIGS. 7 and 8, to the perimeter of a soft substrate (e.g., perimeter 20 or perimeter 21) of soft substrate 21) may be selected such that the reinforcement member may provide the increased resistance to the application of a compressive force in the manner described herein. For example, the reinforcement member(s) may be located in soft substrate in the area at which the compressive force is applied to the surface of the component. The location of the reinforcement member(s) in soft substrate 12 may be selected such that there is some amount of soft substrate material between the hard coating at the perimeter and the reinforcement members. Such a parameter may be driven by either the materials used, and/or the fabrication process. In some examples, the size and/or location of the reinforcement members in the soft substrate may be first selected (e.g., based on one or more design considerations), and then the load area at which the compressive force is applied (e.g., by a bolt or clamp) may be tailored based on the reinforcement members (e.g., by altering the dimensions of the attachment bolt flange or clamp).

In some example, the distance between the perimeter of a soft substrate and the one or more reinforcement members may be less than approximately a few feet, such as, e.g., less than approximately a foot, such as, e.g., less than approximately 6 inches, such as, e.g., less than approximately 3 inches, such as, e.g., less than approximately 2 inches, such as, e.g., less than approximately 1 inch, such as, e.g., less than approximately 0.75 inches, such as, e.g., less than approximately 0.5 inches, such as, e.g., less than approximately 0.25 inches, such as, e.g., less than approximately 0.1 inches, such as, e.g., less than approximately 0.05 inches, such as, e.g., less than approximately 0.01 inches, such as, e.g., less than approximately 0.005 inches, although other values are contemplated.

Figure 9:
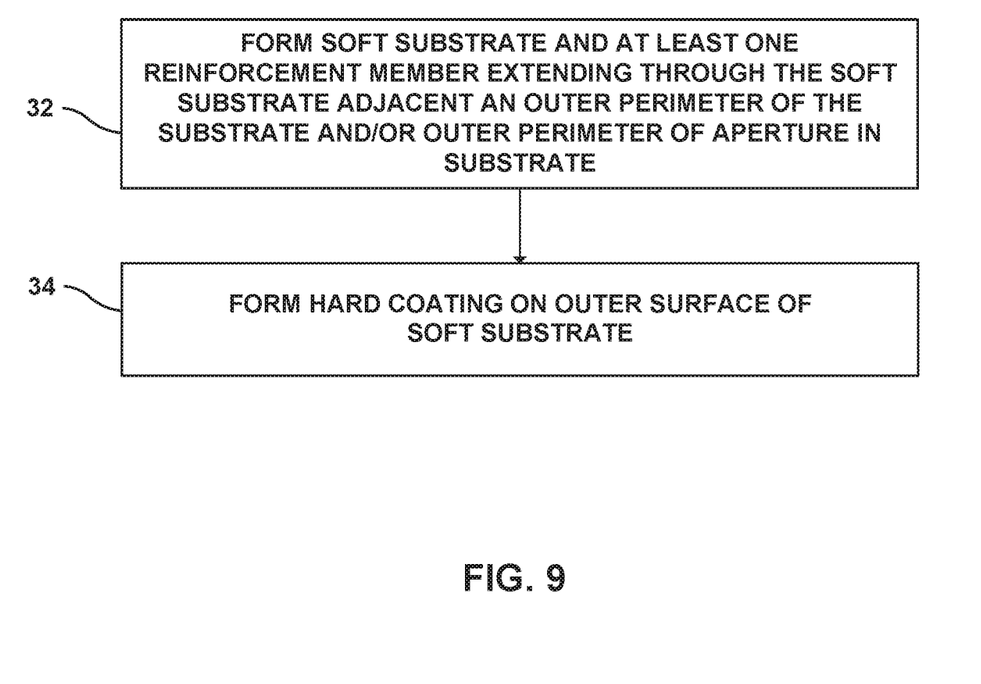
FIG. 9 is a flow diagram illustrating an example technique for forming an example article of this disclosure.

FIG. 9 is a flow diagram illustrating an example technique for forming an example article of this disclosure. For ease of description, the example technique is described with regard to component 10 of FIGS. 1-3 but may be employed in other examples including those shown in FIGS. 7 and 8.

As shown, soft substrate 12 may be formed with aperture 16 and reinforcement members 18 extending through soft substrate 12 adjacent to aperture 16 (32). Hard coating 14 may then be formed on the outer surface of soft substrate 34.

Any suitable process may be used to form soft substrate 12 with aperture 16 and reinforcement members 18. For example, soft substrate 12 may be formed first, e.g., by curing or casting in a mold, then aperture 16 formed via drilling and reinforcement members 18 may be inserted into adjacent drilled out holes. As another example, soft substrate 12 may be cured or cast in mold with aperture 16 defined by the mold, wherein the mold also contains the reinforcement members 18 located at the desired location within soft substrate 12 once cured. The manufacturing method for soft substrate may drive the process. For instance, molding or additive manufacturing methods may provide an avenue to place the reinforcement member 18 in soft substrate 12 without having to add reinforcement members 18 after soft substrate 12 have been formed.

Hard coating 14 may be formed on soft substrate 12 (34) using any suitable process including those deposition processes described above. As noted above, hard coating 14 may be formed on substrate either before or after reinforcement members are placed adjacent to aperture 16.

Various examples have been described. These and other examples are within the scope of the following claims.

The invention claimed is:

1. An article comprising:
a soft substrate defining a first surface and a second surface opposite the first surface;
a hard coating on the first surface and the second surface of the soft substrate, wherein an aperture extends through the hard coating on the first surface and the second surface, and extends through the soft substrate from the first surface to the second surface, wherein the aperture defines a sidewall of the soft substrate extending from the first surface to the second surface; and
at least one reinforcement member extending through the soft substrate from the first surface to the second surface of the soft substrate at a location adjacent to the sidewall, wherein the sidewall is between the aperture and the at least one reinforcement member, and wherein the at least one reinforcement member increases resistance to compression of the soft substrate at the location of the at least one reinforcement member.

2. The article of claim 1, wherein the at least one reinforcement member comprises a plurality of individual reinforcement member distributed adjacent to the sidewall.

3. The article of claim 1, wherein the at least one reinforcement member comprises a continuous ring surrounding the aperture.

4. The article of claim 1, wherein the aperture extends through the soft substrate in a first direction, the article further comprising an attachment bolt extending through the aperture and applying a compressive force on the soft substrate in a second direction substantially parallel to a first direction, and wherein the at least one reinforcement member increases resistance of the soft substrate to the compressive force applied by the attachment bolt.

5. The article of claim 1, further comprising:
another substrate; and
an attachment mechanism that attaches the soft substrate to the another substrate by applying a compressive force on the soft substrate at the location of the at least one reinforcement member, wherein the at least one reinforcement member increases resistance of the soft substrate to the compressive force applied by the attachment mechanism.

6. The article of claim 1, wherein the at least one reinforcement member has substantially a same composition as the hard coating.

7. The article of claim 1, wherein the soft substrate comprises a polymer-based substrate.

8. The article of claim 1, wherein the hard coating comprises a metallic coating.

9. The article of claim 8, wherein the metallic coating comprises a metal selected from the group consisting of cobalt, nickel, copper, iron, cobalt-based alloy, nickel-based alloy, copper-based alloy, or iron-based alloy.

10. The article of claim 1, wherein the hard coating is on the sidewall between the first surface and the second surface of the soft substrate.

11. The article of claim 1, wherein a portion of the soft substrate is between the at least one reinforcement member and the sidewall.

12. An article comprising:
a soft substrate defining a first surface, a second surface opposite the first surface, and a sidewall extending between the first surface and the second surface at an outer perimeter of the soft substrate;
a hard coating on the first surface and the second surface of the soft substrate; and
at least one reinforcement member extending from the first surface to the second surface at a location adjacent to the sidewall, wherein a portion of the soft substrate is between the sidewall and the at least one reinforcement member, and wherein the at least one reinforcement member increases resistance to compression of the soft substrate at the location of the at least one reinforcement member.

13. The article of claim 12, wherein the at least one reinforcement member comprises a plurality of individual reinforcement member distributed adjacent to the sidewall.

14. The article of claim 12, further comprising a clamp adjacent the outer perimeter of the soft substrate, wherein the clamp applies a compressive force on the soft substrate adjacent the outer perimeter of the substrate, and wherein the at least one reinforcement member increases resistance of the soft substrate to the compressive force applied by the clamp.

15. The article of claim 12, further comprising:
another substrate; and
an attachment mechanism that attaches the soft substrate to the another substrate by applying a compressive force on the soft substrate at the location of the at least one reinforcement member, wherein the at least one reinforcement member increases resistance of the soft substrate to the compressive force applied by the attachment mechanism.

16. The article of claim 12, wherein the at least one reinforcement member has substantially a same composition as the hard coating.

17. The article of claim 12, wherein the soft substrate comprises a polymer-based substrate.

18. The article of claim 12, wherein the hard coating comprises a metallic coating.

19. The article of claim 12, wherein the hard coating is on the sidewall between the first surface and the second surface of the soft substrate.

* * * * *